(12) United States Patent
Zamora et al.

(10) Patent No.: US 7,220,708 B2
(45) Date of Patent: *May 22, 2007

(54) DRILLING FLUID COMPONENT

(75) Inventors: Frank Zamora, Duncan, OK (US); Larry S. Eoff, Duncan, OK (US); Eldon Dwyann Dalrymple, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 193 days.

This patent is subject to a terminal disclaimer.

(21) Appl. No.: 10/375,787

(22) Filed: Feb. 27, 2003

(65) Prior Publication Data
US 2004/0171495 A1    Sep. 2, 2004

(51) Int. Cl.
C09K 8/588 (2006.01)
C09K 8/22 (2006.01)
E21B 21/14 (2006.01)

(52) U.S. Cl. .................. 507/221; 166/305.1; 507/118; 507/119; 507/224

(58) Field of Classification Search ................. 507/221
See application file for complete search history.

(56) References Cited

U.S. PATENT DOCUMENTS

| 2,863,832 | A | 12/1958 | Perrine ........................ 252/8.55 |
| 2,910,436 | A | 10/1959 | Fatt et al. .................... 252/8.55 |
| 3,215,199 | A | 11/1965 | Dilgren ........................ 166/38 |
| 3,251,415 | A | 5/1966 | Bombardieri et al. .......... 166/42 |
| 3,297,090 | A | 1/1967 | Dilgren ........................ 166/38 |
| 3,307,630 | A | 3/1967 | Dilgren et al. ................ 166/38 |
| 3,382,924 | A | 5/1968 | Veley et al. .................. 166/42 |
| 3,434,971 | A | 3/1969 | Atkins ........................ 252/8.55 |
| 3,441,085 | A | 4/1969 | Gidley ........................ 166/307 |
| 3,451,818 | A | 6/1969 | Wareham ........................ 96/78 |
| 3,744,566 | A | 7/1973 | Szabo et al. |
| 3,910,862 | A | 10/1975 | Barabas et al. ..... 260/79.3 MU |
| 4,129,183 | A | 12/1978 | Kalfoglou .................... 166/300 |
| 4,142,595 | A | 3/1979 | Anderson et al. |
| 4,152,274 | A | 5/1979 | Phillips et al. |
| 4,158,521 | A | 6/1979 | Anderson et al. ........... 405/264 |
| 4,158,726 | A | 6/1979 | Kamada et al. .............. 526/200 |
| 4,299,710 | A | 11/1981 | Dupre et al. ............. 252/8.5 A |
| 4,306,981 | A | 12/1981 | Blair, Jr. |
| 4,337,828 | A | 7/1982 | Blair, Jr. |
| 4,366,071 | A | 12/1982 | McLaughlin et al. .. 252/8.55 R |
| 4,366,072 | A | 12/1982 | McLaughlin et al. .. 252/8.55 R |
| 4,366,073 | A | 12/1982 | McLaughlin et al. .. 252/8.55 R |
| 4,366,074 | A | 12/1982 | McLaughlin et al. .. 252/8.55 R |
| 4,374,739 | A | 2/1983 | McLaughlin et al. .. 252/8.55 R |
| 4,393,939 | A | 7/1983 | Smith et al. ................ 166/293 |
| 4,395,340 | A | 7/1983 | McLaughlin ........... 252/8.55 D |
| 4,401,789 | A | 8/1983 | Gideon ........................ 524/827 |
| 4,439,334 | A | 3/1984 | Borchardt .............. 252/8.55 D |
| 4,440,649 | A | 4/1984 | Loftin et al. ............. 252/8.5 C |
| 4,447,342 | A | 5/1984 | Borchardt et al. ..... 252/8.55 D |
| 4,460,627 | A | 7/1984 | Weaver et al. ............... 427/212 |
| 4,462,718 | A | 7/1984 | McLaughlin et al. ........ 405/264 |
| 4,532,052 | A | 7/1985 | Weaver et al. ......... 252/8.55 R |
| 4,536,297 | A | 8/1985 | Loftin et al. ............. 252/8.5 C |
| 4,536,303 | A | 8/1985 | Borchardt .............. 252/8.55 R |
| 4,536,305 | A | 8/1985 | Borchardt et al. ..... 252/8.55 R |
| 4,552,670 | A | 11/1985 | Lipowski et al. |
| 4,554,081 | A | 11/1985 | Borchardt et al. ....... 252/8.5 A |
| 4,563,292 | A | 1/1986 | Borchardt .............. 252/8.55 R |
| 4,604,216 | A | 8/1986 | Irvin et al. .................. 252/8.51 |
| 4,627,926 | A | 12/1986 | Peiffer et al. .......... 252/8.55 R |
| 4,671,883 | A | 6/1987 | Connell et al. .......... 252/8.515 |
| 4,693,639 | A | 9/1987 | Hollenbeak et al. ........ 405/263 |
| 4,699,722 | A | 10/1987 | Dymond et al. .......... 252/8.551 |
| 4,730,028 | A | 3/1988 | Bock et al. .................. 526/225 |
| 4,828,726 | A | 5/1989 | Himes et al. ............. 252/8.553 |
| 4,951,921 | A | * 8/1990 | Stahl et al. .................. 166/270 |
| 4,956,104 | A | 9/1990 | Cowan et al. |
| 4,959,432 | A | 9/1990 | Fan et al. .................... 526/287 |
| 5,071,934 | A | 12/1991 | Peiffer ........................ 526/307 |
| 5,097,904 | A | 3/1992 | Himes ........................ 166/294 |
| 5,146,986 | A | 9/1992 | Dalrymple .................. 166/294 |
| 5,160,642 | A | 11/1992 | Schield et al. ........... 252/8.551 |
| 5,197,544 | A | 3/1993 | Himes ........................ 166/294 |
| 5,208,216 | A | 5/1993 | Williamson et al. ........ 507/120 |
| 5,244,042 | A | 9/1993 | Dovan et al. ................ 166/270 |
| 5,248,665 | A | 9/1993 | Hale et al. |
| 5,271,466 | A | 12/1993 | Harms ........................ 166/300 |
| 5,342,530 | A | 8/1994 | Aften et al. ............. 252/8.551 |
| 5,379,841 | A | 1/1995 | Pusch et al. ................ 166/295 |
| 5,382,371 | A | 1/1995 | Stahl et al. |
| 5,473,059 | A | 12/1995 | Yeh |
| 5,607,902 | A | 3/1997 | Smith et al. ................ 507/120 |

(Continued)

FOREIGN PATENT DOCUMENTS

DE    2 250 552    4/1974

(Continued)

OTHER PUBLICATIONS

Paper entitled "Controlling Formation Damage Using Clay Stabilizers: A Review", by Z. J. Zhou et al., dated 1995.

(Continued)

Primary Examiner—Randy Gulakowski
Assistant Examiner—Timothy J. Kugel
(74) Attorney, Agent, or Firm—Robert A. Kent; Haynes & Boone, LLP

(57) ABSTRACT

A method and composition is provided for a relative permeability modifying polymer for use with drilling fluids that comprises a water soluble polymer formed from a hydrophobic or hydrophobically modified hydrophilic monomer and a hydrophilic monomer. In an alternative embodiment, a method is provided for producing a water soluble polymer formed from a hydrophilic monomer for use as a relative permeability modifying polymer.

17 Claims, No Drawings

U.S. PATENT DOCUMENTS

| | | | |
|---|---|---|---|
| 5,646,093 A | 7/1997 | Dino | |
| 5,669,456 A | 9/1997 | Audibert et al. | 175/72 |
| 5,677,266 A | 10/1997 | Audibert et al. | |
| 5,728,653 A | 3/1998 | Audibert et al. | |
| 5,735,349 A * | 4/1998 | Dawson et al. | 166/295 |
| 5,887,653 A | 3/1999 | Bishop et al. | 166/281 |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 6,020,289 A * | 2/2000 | Dymond | 507/120 |
| 6,070,664 A | 6/2000 | Dalrymple et al. | 166/281 |
| 6,124,245 A | 9/2000 | Patel | 507/120 |
| 6,187,839 B1 * | 2/2001 | Eoff et al. | 523/130 |
| 6,194,356 B1 | 2/2001 | Jones et al. | |
| 6,228,812 B1 | 5/2001 | Dawson et al. | 507/221 |
| 6,237,687 B1 | 5/2001 | Barbee, Jr. et al. | 166/278 |
| 6,253,851 B1 | 7/2001 | Schroeder, Jr. et al. | 166/278 |
| 6,277,900 B1 | 8/2001 | Oswald et al. | 523/130 |
| 6,283,210 B1 | 9/2001 | Soliman et al. | 166/270 |
| 6,358,889 B2 | 3/2002 | Waggenspack et al. | |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,476,169 B1 | 11/2002 | Eoff et al. | 526/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,569,983 B1 | 5/2003 | Treybig et al. | 528/102 |
| 6,607,035 B1 | 8/2003 | Reddy et al. | |
| 6,609,578 B2 | 8/2003 | Patel et al. | 175/64 |
| 6,627,719 B2 | 9/2003 | Whipple et al. | |
| 6,710,107 B2 | 3/2004 | Audibert et al. | 524/5 |
| 6,764,981 B1 | 7/2004 | Eoff et al. | |
| 6,780,822 B2 | 8/2004 | Cowan et al. | |
| 6,787,506 B2 | 9/2004 | Blair et al. | 507/222 |
| 6,790,812 B2 | 9/2004 | Halliday et al. | |
| 6,803,348 B2 | 10/2004 | Jones et al. | |
| 6,846,420 B2 | 1/2005 | Reddy et al. | |
| 6,855,672 B2 | 2/2005 | Poelker et al. | |
| 6,981,552 B2 | 1/2006 | Reddy et al. | |
| 2003/0019627 A1 | 1/2003 | Qu et al. | 166/281 |
| 2003/0104948 A1 | 6/2003 | Poelker et al. | |
| 2003/0191030 A1 | 10/2003 | Blair et al. | 507/225 |
| 2004/0045712 A1 | 3/2004 | Eoff et al. | 166/293 |
| 2004/0102331 A1 | 5/2004 | Chan et al. | 507/100 |
| 2004/0171495 A1 | 9/2004 | Zamora et al. | |
| 2004/0220058 A1 | 11/2004 | Eoff et al. | |
| 2004/0229756 A1 | 11/2004 | Eoff et al. | |
| 2004/0229757 A1 | 11/2004 | Eoff et al. | |
| 2005/0000694 A1 | 1/2005 | Dalrymple et al. | |

FOREIGN PATENT DOCUMENTS

| | | |
|---|---|---|
| EP | 0383337 A2 | 8/1990 |
| EP | 0 896 122 A2 | 2/1999 |
| EP | 1 033 378 A1 | 2/2000 |
| EP | 1193365 A1 | 4/2002 |
| EP | 1 312 753 A1 | 5/2003 |
| GB | 2 221 940 A | 2/1990 |
| GB | 2 335 428 A | 9/1999 |
| WO | WO 93/15164 | 8/1993 |
| WO | WO 99/49183 | 9/1999 |
| WO | WO 99/50530 | 10/1999 |
| WO | WO 00/78890 A1 | 12/2000 |
| WO | WO 02/097236 A1 | 12/2002 |
| WO | WO 03/056130 A1 | 7/2003 |
| WO | WO 2004/094781 A1 | 11/2004 |
| WO | WO2004/101706 A1 | 11/2004 |

OTHER PUBLICATIONS

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf.

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=0064985.pdf.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.

Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.

Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.

BJ Services Company, *Aquacon, Product Information*, Aug. 1, 2001, pp. 1-2.

BJ Services Company, *Aquatrol I, Product Information*, Dec. 14, 2000, pp. 1-2.

SPE 64985 entitled "Structure and Process Optimization for The Use Of A Polymeric Relative-Permeability Modifier in Conformance Control" by Larry S. Eoff et al, dated 2001.

SPE 68973 entitled "Relative Permeability Modifiers: Myth or Reality" by C. Wouter Botermans et al., dated 2001.

Foreign communication from a related counterpart application dated May 11, 2005.

U.S. Appl. No. 10/763,800 entitled "Methods and Compositions for the Diversion of Aqueous Injection Fluids in Injection Operations" by Larry Eoff et al.

U.S. Appl. No. 10/780,995 entitled "Methods of Reducing the Permeabilities of Horizontal Well Bore Sections" by Larry Eoff et al.

U.S. Appl. No. 10/806,894 entitled "Permeability-Modifying Drilling Fluids and Methods of Use" by Larry Eoff et al.

U.S. Appl. No. 10/825,001 entitled "Hydrophobically Modified Polymers for a Well Completion Spacer Fluid" by Larry Eoff et al.

U.S. Appl. No. 10/872,997 entitled "Cement Compositions with Improved Fluid Loss Characteristics and Methods of Cementing Using Such Cement Compositions" by Larry Eoff.

U.S. Appl. No. 10/881,198 entitled "Methods Useful for Controlling Fluid Loss During Sand Control Operations" by Eldon D. Dalrymple et al.

U.S. Appl. No. 10/893,210 entitled "Methods and Compositions for Use with Spacer Fluids Used in Subterranean Well Bores" by Larry Eoff et al.

U.S. Appl. No. 11/102,062 entitled "Methods of Useful for Controlling Fluid Loss in Subterranean Treatments" by Leopolodo Sierra et al.

Communication from the U.S. Patent and Trademark Office dated Apr. 23, 2002 regarding U.S. Appl. No. 09/677,826.

Communication from the U.S. Patent and Trademark Office dated Aug. 13, 2002 regarding U.S. Appl. No. 09/677,826.

U.S. Appl. No. 10/763,800 entitled "Methods and Compositions for the Diversion of Aqueous Injection Fluids in Injection Operations" by Larry Eoff et al, Pub Jul. 28, 2005.

U.S. Appl. No. 10/780,995 entitled "Methods of Reducing the Permeabilities of Horizontal Well Bore Sections" by Larry Eoff et al, Pub Aug. 18, 2005.

U.S. Appl. No. 10/806,894 entitled "Permeability-Modifying Drilling Fluids and Methods of Use" by Larry Eoff et al, Pub Jul. 21, 2005.

U.S. Appl. No. 10/825,001 entitled "Hydrophobically Modified Polymers for a Well Completion Spacer Fluid" by Larry Eoff et al, Pub Oct. 20, 2005.

U.S. Appl. No. 10/872,997 entitled "Cement Compositions with Improved Fluid Loss Characteristics and Methods of Cementing Using Such Cement Compositions" by Larry Eoff, Pub Dec. 22, 2005.

U.S. Appl. No. 10/881,198 entitled "Methods Useful for Controlling Fluid Loss During Sand Control Operations" by Eldon D. Dalrymple et al, Pub Dec. 29, 2005.

U.S. Appl. No. 10/893,210 entitled "Methods and Compositions for Use with Spacer Fluids Used in Subterranean Well Bores" by Larry Eoff et al, Pub Oct. 20, 2005.

U.S. Appl. No. 11/102,062 entitled "Methods of Useful for Controlling Fluid Loss in Subterranean Treatments" by Leopolodo Sierra et al, Pub Sep. 15, 2005.

* cited by examiner

DRILLING FLUID COMPONENT

BACKGROUND

The present embodiment relates generally to a relative permeability modifying polymer for use with drilling fluids.

While drilling oil and gas wells, a drilling fluid, which may be oil-based or water-based as explained below, is circulated through a drill bit in a well bore and then back to the earth's surface, thereby lubricating the drill string and removing cuttings from the well bore. This phase in the life of a well is known as the "drilling phase." It is understood that there is also a "production phase" in the life of a well during which hydrocarbons or other desired substances are produced from the well.

The well bore may pass through zones which produce water instead of hydrocarbons. Besides being highly undesirable during the production phase, water producing zones can cause problems in the well bore with certain completion activities. However, water production is generally ignored during the drilling phase.

If the water production problem becomes severe during the production phase, remedial steps such as isolation of the water producing zone and application of a sealant are taken. Obviously, such remedial steps are time consuming and expensive. Moreover, the sealant may interfere with the production of hydrocarbons if it enters a hydrocarbon producing zone.

Recently, wells in the production phase have been successfully treated with compounds known as relative permeability modifiers, which decrease the co-production of water with hydrocarbons by reducing the flow of water through hydrocarbon producing formations, yet have little or no effect on the permeability of the formations with respect to hydrocarbons. However, it is desirable to curb water production as early as possible in the life of a well, and to produce more effective relative permeability modifying compositions.

Thus, what is needed is a method and composition for modifying the permeability of water producing zones during the drilling phase of a well without affecting the subsequent production of hydrocarbons.

DESCRIPTION

A relative permeability modifying polymer according to the present embodiment for use with drilling fluids comprises a water soluble polymer formed from a hydrophobic or hydrophobically modified hydrophilic monomer and a hydrophilic monomer. Another embodiment includes a method for producing a water soluble polymer formed from a hydrophilic monomer for use as a relative permeability modifying polymer.

Acceptable polymers for use as a relative permeability modifying polymer of the present invention are described in U.S. patent application Ser. No. 10/236,722 and U.S. Pat. No. 6,476,169, the entire disclosures of which are incorporated herein as if reproduced in their entireties. In short, the polymers comprise a hydrophobic or hydrophobically modified hydrophilic monomer and a hydrophilic monomer.

A group of hydrophobic or hydrophobically modified hydrophilic monomers suitable for use in preparing the relative permeability modifying polymer of the present invention are listed in TABLE 1 under the heading "Component A." Likewise, a group of hydrophilic monomers suitable for use in preparing the relative permeability modifying polymer of the present invention are listed in TABLE 1 under the heading "Component B."

TABLE 1

| Component A | Component B |
|---|---|
| C4–C22 alkyl acrylates | acrylamide |
| C4–C22 alkyl methacrylates | 2-acrylamido-2-methyl propane sulfonic acid |
| C4–C22 alkyl acrylamides | N,N-dimethylacrylamide |
| C4–C22 alkyl methacrylamides | vinyl pyrrolidone |
| C4–C22 alkyl dimethylammoniumethyl methacrylate halides | acrylic acid |
|  | dimethylaminopropylmethacrylamide ("DMAPMA") |
| C4–C22 alkyl dimethylammonium-propylmethacrylamide halides | trimethylammoniumethyl methacrylate chloride |
|  | methacrylamide |
|  | hydroxyethyl acrylate |
|  | dimethylaminoethyl methacrylate ("DMEMA") |

Referring to TABLE 1, a polymer for use as a relative permeability modifying polymer of the present invention comprises at least one Component A monomer and at least one Component B monomer. Such polymers have mole ratios of Component A to Component B in a range from 10:90 to 0.02:99.98, and molecular weights in the range of from 250 kDalton to 3,000 kDalton.

In a first embodiment, a relative permeability modifying polymer comprises a water soluble Component A monomer polymerized with any of the Component B monomers.

In a second embodiment, a relative permeability modifying polymer comprises a water insoluble Component A monomer, such as octadecylmethacrylate, that is mixed with a surfactant well known to those of ordinary skill in the art such as alkyl ammonium salts, alkylaryl ammonium salts, alkyl sulfates, alkyl ether sulfates, alkoxylates, and betaines, and then polymerized with any of the Component B monomers.

In a third embodiment, a relative permeability modifying polymer comprises a copolymer of dimethylaminoethyl methacrylate ("DMEMA") and alkyl-DMEMA halide.

In a fourth embodiment, a relative permeability modifying polymer comprises a copolymer of dimethylaminopropyl methacrylamide ("DMAPMA") and alkyl-DMAPMA halide.

According to a method of the present embodiment for forming a relative permeability modifying polymer comprising a water soluble polymer formed from a hydrophilic monomer, the method comprises polymerizing a tertiary amine, such as DMEMA, to form poly-DMEMA homopolymer and then hydrophobically modifying the poly-DMEMA homopolymer by partial quaternization with an alkyl halide to form a copolymer of DMEMA and alkyl-DMEMA halide. Preferably, the alkyl halide is C16 alkyl (hexadecyl) bromide. More preferably, the alkyl halide is C16 alkyl (n-hexadecyl) bromide.

According to another method of the present embodiment of forming a relative permeability modifying polymer comprising a water soluble polymer formed from a hydrophilic monomer, the method comprises polymerizing an amine-containing compound, such as DMAPMA to form poly-DMAPMA homopolymer and then hydrophobically modifying the poly-DMAPMA homopolymer by partial quaternization with an alkyl halide to form a copolymer of DMAPMA and alkyl-DMAPMA halide.

In operation, a relative permeability modifying polymer according to the foregoing is placed down hole in a well bore that includes water producing zones for modifying the permeability of the water producing zones without affecting the production of hydrocarbons.

In a first embodiment of operation, the relative permeability modifying polymer is mixed with a drilling fluid. Applicants propose that during the normal "leak-of" of drilling fluid filtrate into the formation, the relative permeability modifying polymer is adsorbed into the formation. As shown in the accompanying examples, this leads to a significant percentage reduction in water permeability. Preferably, the drilling fluid is a water-based drilling fluid. The term "water-based drilling fluid" is used to refer to drilling fluids that have an aqueous continuous phase. Alternatively, an oil-based drilling fluid may be used. The term "oil-based drilling fluid" is used to refer to drilling fluids that have an oil-based continuous phase. Although oil-based drilling fluids have an oil-based continuous phase, it is understood that they also comprise an emulsified aqueous phase, which allows the relative permeability modifying polymer to be incorporated into the drilling fluid. The relative permeability modifying polymer is added to the drilling fluid in a range of 500 ppm to 10,000 ppm of the drilling fluid. It is understood that the use of the relative permeability modifying polymer with drill-in fluids and completion fluids, as well as the above-mentioned drilling fluids is also contemplated.

Alternatively, in operation, the relative permeability modifying polymer can be spotted as a pill over a water producing zone after cessation of drilling. The pill, comprising an aqueous solution of the relative permeability modifying polymer, is squeezed into the formation in a conventional manner, and drilling resumed. As shown in the accompanying examples, this leads to a significant percentage reduction in water permeability. The relative permeability modifying polymer may be dissolved in an aqueous carrier liquid, comprising fresh water, seawater, or an aqueous salt solution. An aqueous salt solution preferably contains one or more salts, such as potassium chloride, sodium chloride, ammonium chloride, and calcium chloride, in an amount in the range of 2% to 10% by weight of the solution. The relative permeability modifying polymer is added in a range of 500 ppm to 10,000 ppm of the aqueous carrier liquid.

It can be readily appreciated that a relative permeability modifying polymer according to the foregoing is advantageous because it can provide improved zonal isolation between zones at the time of completion, eliminate or postpone the need for water shutoff during the production phase of the well, and extend the production phase of the well life.

The following examples are illustrative of the methods and compositions discussed above.

EXAMPLE 1

A relative permeability modifying polymer of the present embodiment can be made by mixing 47.7 grams ("g") deionized water, 0.38 g C16 alkyl(n-hexadecyl)dimethylammonium ethyl methacrylate bromide, and 1.1 g acrylamide, and sparging with nitrogen for approximately 30 minutes. Thereafter, a polymerization initiator, such as 0.0127 g of 2,2'-azo bis (2-amidinopropane)dihydrochloride is added. The resulting solution is then heated, with stirring, to 110° F. and held for 18 hours to produce a highly viscous polymer solution.

EXAMPLE 2

A relative permeability modifying polymer of the present embodiment can be made by mixing 41.2 g deionized water, 0.06 g of octadecyl methacrylate, 0.45 g of a cocoamidopropyl betaine surfactant, and 1.26 g acrylamide. Thereafter, a polymerization initiator, such as 0.0127 g of 2,2'-azo bis(2-amidinopropane)dihydrochloride is added. The resulting solution is then heated, with stirring, to 110° F. and held for 18 hours to produce a highly viscous polymer solution.

EXAMPLE 3

A polymer can be made by mixing 1968.0 g deionized water, 105.0 g DMEMA and sparging with nitrogen for 30 minutes. Thereafter, the pH is adjusted to approximately 7.9 with sulfuric acid and a polymerization initiator, such as 0.46 g of 2,2'-azo bis(2-amidinopropane)dihydrochloride is added to form poly-DMEMA.

The poly-DMEMA is then hydrophobically modified by adding 71.0 g of poly-DMEMA to a 250 mL round bottom flask, followed by 15% NaOH to achieve a pH of approximately 8.9. Next, 54.6 g water, 0.36 g C16 alkyl(n-hexadecyl)bromide, and 0.39 g benzylcetyldimethylammonium bromide surfactant are added to quaternize the poly-DMEMA homopolymer and form a DMEMA-C16 alkyl-DMEMA copolymer. This mixture is then heated, with stirring, to 140° F. for 24 hours to produce a highly viscous polymer solution, namely, the relative permeability modifying polymer.

EXAMPLE 4

A relative permeability modifying polymer was prepared comprising a pH 6 solution of 2% potassium chloride by weight and 6000 ppm C16 alkyl poly-DMEMA polymer from EXAMPLE 3 to conduct a conventional water permeability reduction test. The test was carried out at 200° F. utilizing a Hassler sleeve containing a Berea brown sandstone core and having three pressure taps (as well as an inlet and an outlet for determining pressure), thereby dividing the core into four segments. The core experiences a flow sequence conventionally referred to as 1) water, 2) oil, 3) water, 4) treatment fluid, and 5) water. The water used in the permeability reduction test is a brine containing 9% sodium chloride by weight and 1% calcium chloride by weight. The oil used in the permeability reduction test is kerosene.

The first two flow steps (water, oil) prepare the core for the test. In the third flow step, the brine was passed through the core until the pressure stabilized, and the initial permeability of the core was measured by determining the pressure at the pressure taps and outlet. The results are listed in TABLE 2 as "Initial Core Permeability." Thereafter, the treatment fluid containing the relative permeability modifying polymer was passed through the core. Next, brine was passed through the core to determine the permeability of the core after treatment. This data was used to calculate a percentage reduction in permeability according to the formula:

$$(1-(\text{final permeability}/\text{initial permeability}))\times 100$$

The results are reported in TABLE 2 as "Percent Reduction of Water Permeability." The Initial Core Permeability and Final Core Permeability are reported in Mdarcy ("mD") units.

TABLE 2

| | Initial Core Permeability mDarcy ("mD")D- | Final Core Permeability | Percent Reduction of Water Permeability |
|---|---|---|---|
| Total | 465 | 4.65 | 99 |
| Segment 1 | 782 | — | — |
| Segment 2 | 322 | 3.22 | 99 |
| Segment 3 | 465 | 4.65 | 99 |
| Segment 4 | 1095 | 10.95 | 99 |

The polymer is very effective, as TABLE 2 shows a 99% brine permeability reduction.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

The invention claimed is:

1. A method of reducing the water permeability of a formation comprising:
    forming a well bore in a formation using a drilling fluid comprising a polymer, wherein the polymer comprises:
        (i) a hydrophobically modified hydrophilic monomer selected from the group consisting of alkyl dimethylammoniumethyl methacrylate halides and alkyl dimethylammonium propylmethacrylamide halides, wherein the alkyl groups have from about 4 to about 22 carbon atoms; and
        (ii) a hydrophilic monomer selected from the group consisting of 2-acrylamido-2-methyl propane sulfonic acid, N,N-dimethylacryl amide, vinyl pyrrolidone, dimethylaminoethyl methacrylate, acrylic acid, dimethylaminopropylmethacrylamide, trimethylammoniumethyl methacrylate chloride, methacrylamide and hydroxyethyl acrylate; and
    allowing the drilling fluid to enter the formation, thereby allowing the polymer to be adsorbed into the formation, which adsorption causes a reduction in the water permeability of the formation without substantially reducing the hydrocarbon permeability thereof.

2. The method of claim 1 wherein the mole ratio of the monomer of (i) to the monomer of (ii) in the polymer is in the range of from about 10:90 to 0.02:99.98.

3. The method of claim 1 wherein the drilling fluid is water-based.

4. The method of claim 1 wherein the drilling fluid is oil-based.

5. The method of claim 1 wherein the polymer has a molecular weight in the range of from about 250 kDalton to about 3,000 kDalton.

6. The method of claim 1 wherein the monomer of (i) is mixed with a surfactant selected from the group consisting of alkyl ammonium salts, alkylaryl ammonium salts, alkyl sulfates, alkyl ether sulfates, alkoxylates, and betaines.

7. The method of claim 1 wherein the polymer is present in the drilling fluid in an amount of from about 500 ppm to about 10,000 ppm of the drilling fluid.

8. A method of reducing the water permeability of a formation comprising:
    providing a drilling fluid;
    providing a relative permeability modifying polymer, wherein the relative permeability modifying polymer comprises:
        (i) a hydrophobically modified hydrophilic monomer selected from the group consisting of alkyl dimethylammoniumethyl methacrylate halides and alkyl dimethylammonium propylmethacrylamide halides, wherein the alkyl groups have from about 4 to about 22 carbon atoms; and
        (ii) a hydrophilic monomer selected from the group consisting of 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide and hydroxyethyl acrylate;
    wherein the mole ratio of the monomer of (i) to the monomer of (ii) in the polymer is in the range of from about 10:90 to 0.02:99.98;
    mixing the drilling fluid and the relative permeability modifying polymer;
    using the mixed drilling fluid and relative permeability modifying polymer in drilling operations for forming a well bore in a formation; and
    allowing the drilling fluid to enter the formation, thereby allowing the relative permeability modifying polymer to be adsorbed into the formation, which adsorption causes a reduction in the water permeability of the formation without substantially reducing the hydrocarbon permeability thereof.

9. The method of claim 8 wherein the drilling fluid is water-based.

10. The method of claim 8 wherein the drilling fluid is oil-based.

11. The method of claim 8 wherein the relative permeability modifying polymer has a molecular weight in the range of from about 250 kDalton to about 3,000 kDalton.

12. The method of claim 8 wherein the monomer of (i) is mixed with a surfactant selected from the group consisting of alkyl ammonium salts, alkylaryl ammonium salts, alkyl sulfates, alkyl ether sulfates, alkoxylates, and betaines.

13. The method of claim 8 wherein the relative permeability modifying polymer is present in the drilling fluid in an amount of from about 500 ppm to about 10,000 ppm of the drilling fluid.

14. A method of reducing the water permeability of a formation comprising:
    mixing a drilling fluid and a copolymer comprising hexadecyl dimethylammoniumethyl methacrylate halide and dimethylaminoethyl methacrylate;
    forming a well bore in a formation with the mixed drilling fluid and copolymer; and
    allowing the drilling fluid to enter the formation, thereby allowing the copolymer to be adsorbed into the formation, which adsorption causes a reduction in the water permeability of the formation without substantially reducing the hydrocarbon permeability thereof.

15. The method of claim 14 wherein the drilling fluid is water-based.

16. The method of claim 14 wherein the drilling fluid is oil-based.

17. The method of claim 14 wherein the hexadecyl dimethylammoniumethyl methacrylate halide monomer is mixed with a surfactant selected from the group consisting of alkyl ammonium salts, alkylaryl ammonium salts, alkyl sulfates, alkyl ether sulfates, alkoxylates, and betaines prior to copolymerization with dimethylaminoethyl methacrylate.

* * * * *